A. E. FEROE.
Mashing Process.

No. 223,209. Patented Dec. 30, 1879.

WITNESSES:
Chas. Niola
C. Sedgwick

INVENTOR:
A. E. Feroe
BY Munn & Co.
ATTORNEYS.

UNITED STATES PATENT OFFICE.

ALFRED E. FEROE, OF TIVOLI, NEW YORK.

IMPROVEMENT IN MASHING PROCESSES.

Specification forming part of Letters Patent No. 223,209, dated December 30, 1879; application filed October 31, 1878.

*To all whom it may concern:*

Be it known that I, A. E. FEROE, of Tivoli, Dutchess county, New York, have invented a Mashing Process, of which the following is a specification.

The invention consists in converting the starch of malt and grain into dextrine and sugar, as hereinafter described.

Figure 2:
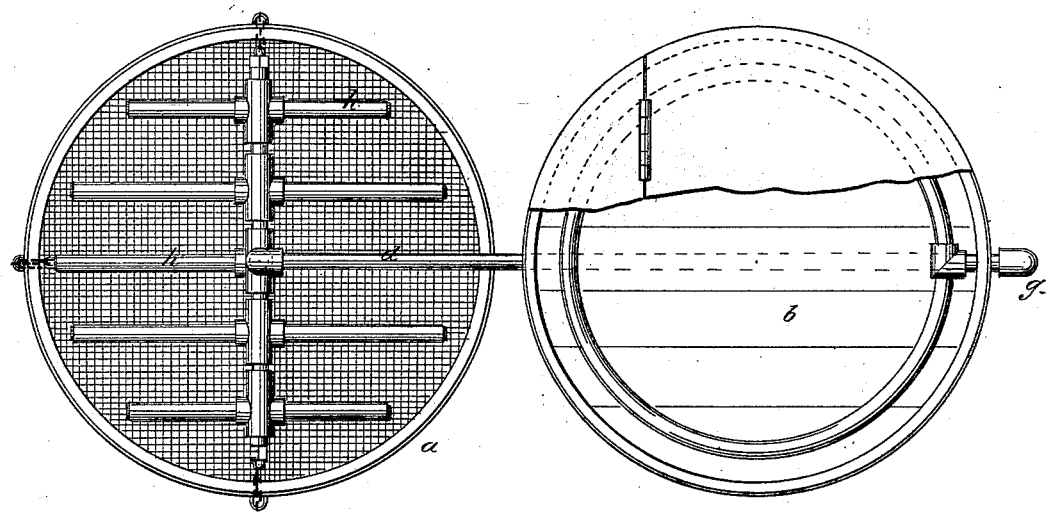
Figure 1:
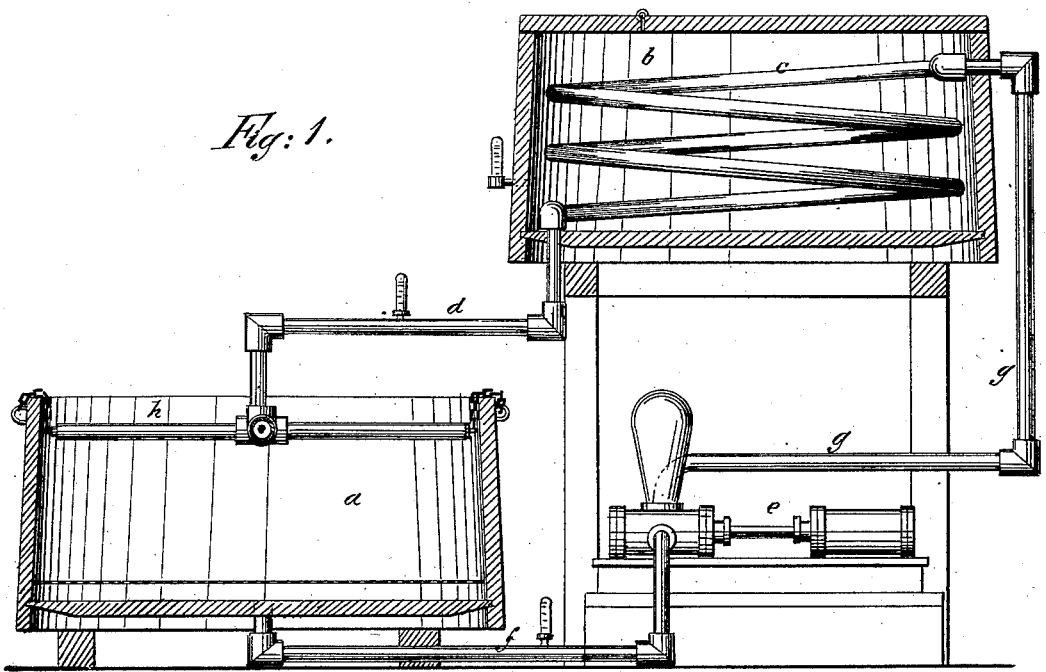

In the drawings, Figure 1 is an elevation, and Fig. 2 a plan view, of an apparatus by which my process may be illustrated and carried out.

$a$ represents a mash-tub; $b$, a smaller tub, provided with coil $c$; $d$, a pipe that connects the coil with the grid of pipes $h$ in the mash-tub, and $e$ a pump, having the induction-pipe $f$ connecting with the bottom of tub $a$, and a discharge-pipe, $g$, the latter passing to the coil-heater $b$.

Thirty-six gallons of water are used to every one hundred of ground malt, the temperature of the water ranging from 140° to 160°, according to the quality of the malt. Hard, dry, or imperfectly germinated malt requires a temperature as low as 120° to 125° after being thoroughly stirred, so as to dissolve as much diastase as possible, as well as to moisten and soften the mash. After standing one hour the temperature is raised gradually and uniformly through the whole mash by pumping the wort as it flows from the bottom of the mash through coils of pipe in the detached tub containing water heated to 160°. This is gradually raised to 170°, so as to bring the temperature of the mash up to 158° for the dextrine, or to 167° for sugar, in about one hour. The warmed wort is then returned from the coils and distributed on top of the malt by the grid of pipes $h$, which have perforations about three-sixteenths of an inch in diameter. After the mash is heated up the pump is employed for about two hours, the wort passing through the coil being sufficiently heated to keep the mash at the proper temperature. At the end of four hours from the time when the malt and water were mixed all of the convertible starch will be changed into dextrine and sugar by the action of the diastase. The wort is then run off into the boiling-kettle and the malt treated with hot water until the wort is reduced to the desired gravity.

I am aware that the conversion of the starch of malt or grain into dextrine or sugar by the diastase has been effected by mixing the meal with water at a temperature above the converting-point; but an effect of this is to produce dextrose or render insoluble a portion of the malt or grain.

What I claim is—

1. The herein-described process of obtaining wort, which consists in first dissolving the diastase of the ground malt in warm water at less than a converting temperature, and then bringing the mash to and keeping it at a converting heat by continuously drawing the wort from the bottom of the tub, heating, and passing it through the mash, as specified.

2. The combination of a mash-tub, a coil of pipe immersed in warm water and connected with the bottom of said tub, and a grid of pipes over the tub, as and for the purpose specified.

ALFRED E. FEROE.

Witnesses:
   C. SEDGWICK,
   GEO. D. WALKER.